United States Patent [19]
Jurca

[11] Patent Number: 6,074,781
[45] Date of Patent: Jun. 13, 2000

[54] ELECTROCHEMICAL CELL HAVING INCREASED ANODE-TO-CATHODE INTERFACE AREA

[75] Inventor: Romulus P. Jurca, Westlake, Ohio

[73] Assignee: Eveready Battery Company, Inc., St. Louis, Mo.

[21] Appl. No.: 09/105,414

[22] Filed: Jun. 26, 1998

[51] Int. Cl.[7] .......................... H01M 4/02; H01M 10/16
[52] U.S. Cl. ...................... 429/209; 429/208; 429/165; 429/166
[58] Field of Search .................... 429/60, 140, 133, 429/165, 166, 167, 168, 169, 208, 209, 224, 229, 164

[56] References Cited

U.S. PATENT DOCUMENTS

| | | | |
|---|---|---|---|
| 2,605,298 | 7/1952 | Marsal | 136/107 |
| 3,617,384 | 11/1971 | Kamai et al. | 136/30 |
| 3,905,834 | 9/1975 | Harada et al. | 136/107 |
| 3,980,496 | 9/1976 | Ludwig et al. | 429/103 |
| 4,032,696 | 6/1977 | Urry | 429/101 |
| 4,315,062 | 2/1982 | Clarizio | 429/246 |
| 4,340,653 | 7/1982 | Adams | 429/133 |
| 5,281,497 | 1/1994 | Kordesch et al. | 429/224 |
| 5,422,201 | 6/1995 | Georgopoulos | 429/170 |
| 5,501,924 | 3/1996 | Swierbut et al. | 429/224 |
| 5,532,078 | 7/1996 | Redey et al. | 429/104 |
| 5,677,080 | 10/1997 | Chen | 429/167 |

FOREIGN PATENT DOCUMENTS

| | | |
|---|---|---|
| 1285202 | 8/1972 | United Kingdom . |
| 2231196 | 11/1990 | United Kingdom . |

*Primary Examiner*—Maria Nuzzolillo
*Assistant Examiner*—Tracy Dove
*Attorney, Agent, or Firm*—Russell H. Toye, Jr.; Robert W. Welsh

[57] ABSTRACT

An electrochemical cell having a large anode-to-cathode interface area which achieves low current density to provide high cell efficiency. The electrochemical cell includes a can containing a first electrode and a second electrode. The first electrode has an outer perimeter which substantially conforms to the interior walls of the can and further has a non-cylindrical cavity provided therein. The second electrode is disposed within the non-cylindrical cavity of the first electrode. The first and second electrodes provide an interface area that varies along the length of the cell. A separator is disposed between the first and second electrodes and a cover and seal assembly is assembled to an open top end of the can.

29 Claims, 2 Drawing Sheets

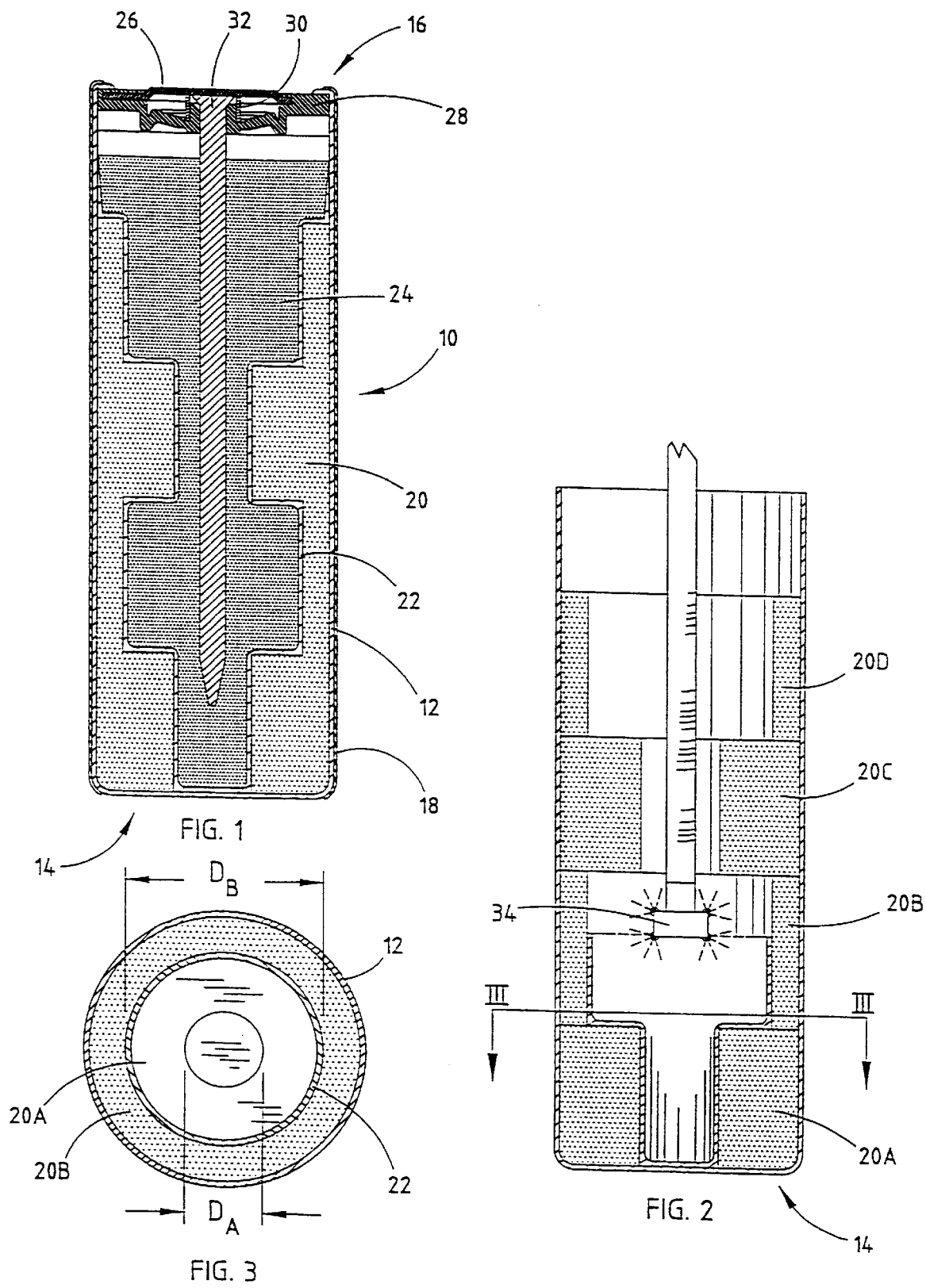

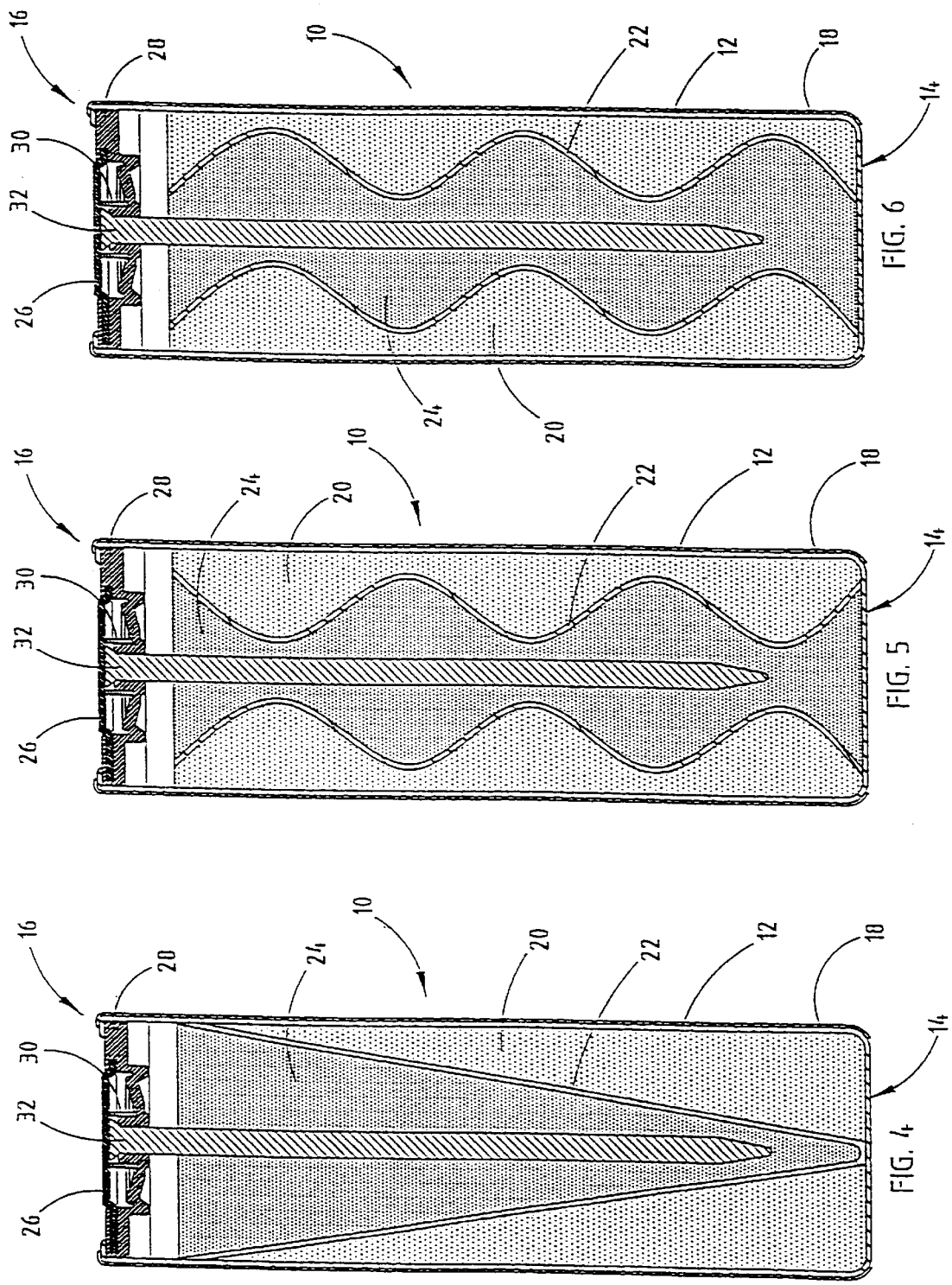

ELECTROCHEMICAL CELL HAVING INCREASED ANODE-TO-CATHODE INTERFACE AREA

BACKGROUND OF THE INVENTION

The present invention generally relates to electrochemical cells and, more particularly, relates to an electrochemical cell having an increased anode-to-cathode interface area.

Electrochemical cells are commonly employed to supply voltage for electrically operated devices, and are particularly well-suited for use with portable electrically operated devices. Currently, the popular conventional alkaline cells are of a generally cylindrical type which are commercially available in industry standard sizes including D-, C-, AA-, AAA-, AAAA-size cells, as well as other sizes and configurations. Electrochemical cells, such as the aforementioned cylindrical type, commonly provide for a predetermined open circuit voltage supply.

Conventional cylindrical alkaline cells generally have a cylindrical-shaped steel can provided with a positive cover at one end and a negative cover at the opposite end. The cylindrical cell has a positive electrode, commonly referred to as the cathode, which is often formed of a mixture of manganese dioxide, potassium hydroxide solution, water, and other additives, formed about the interior side surface of the cylindrical steel can. A cup-shaped separator is centrally disposed in an inner cylindrical volume of the can about the interior surface of the cathode. A negative electrode, commonly referred to as the anode, is typically formed of zinc powder, a gelling agent, and other additives, and is disposed with the electrolyte solution within the separator. The aforementioned cylindrical cell is commonly referred to as a bobbin-type cell, one example of which is disclosed in U.S. Pat. No. 5,501,924, which is hereby incorporated by reference.

Conventional bobbin-type cells of the aforementioned cylindrical type have a single cylindrical anode and single cathode contained within the steel can and separated via the cup-shaped separator. The cathode is usually disposed adjacent to the interior side wall of a steel can, while the anode is disposed within a cylindrical cavity provided in the cathode. Accordingly, the conventional cell has a cylindrical anode-to-cathode interface surface area generally defined by the shape and size of the anode and the cathode. With the conventional cylindrical cell, the anode-to-cathode interface area is approximately equal to the surface area of the cylindrical cavity formed in the cathode, into which the separator is disposed. In addition, the anode is generally provided in the shape of a cylinder with a uniformly curved outer surface generally formed parallel to the container wall such that the cathode is not easily susceptible to breakage which can lead to ionic and electric discontinuity within the cell.

A primary goal in designing alkaline cells is to increase the service performance which is the length of time for the cell to discharge under a given load to a specific voltage at which the cell is no longer useful for its intended purpose. A further goal in designing alkaline cells is to increase the high rate performance of the cell. Commercially available alkaline cells commonly have an external size that is defined by industry standards, thereby limiting the ability to increase the amount of active materials that can be utilized. Yet, the need to find new ways to increase service performance remains a primary goal of the cell designers.

SUMMARY OF THE INVENTION

The present invention improves the performance, and particularly the high rate performance, of an electrochemical cell by providing a cell having an increased anode-to-cathode interface area that realizes low current density and achieves enhanced service performance. To achieve this and other advantages, and in accordance with the purpose of the invention as embodied and described herein, the present invention provides for an electrochemical cell including a container having a closed bottom end and an open top end, and a first electrode disposed within the container and against the inner walls of the container. The first electrode has a non-cylindrical cavity and a second electrode is centrally disposed within the non-cylindrical cavity. The first and second electrodes are configured such that the shape of their interface with each other varies at one or more locations along the length of the cell. A separator is disposed between the first electrode and the second electrode. A cover and seal assembly is assembled to the open top end of the container. Accordingly, the cell has a non-cylindrical first electrode-to-second electrode interface area that is greater than a cylindrical interface area, and yet provides a substantially round radial electrode interface.

These and other features, advantages and objects of the present invention will be further understood and appreciated by those skilled in the art by reference to the following specification, claims and appended drawings.

DESCRIPTION OF THE DRAWINGS

In the drawings:

FIG. 1 is an elevational cross-sectional view of an electrochemical cell of the present invention taken through the central longitudinal axis thereof;

FIG. 2 is an elevational cross-sectional view of a partially assembled cell illustrating assembly of the cell according to the present invention;

FIG. 3 is a radial cross-sectional view of the partially assembled cell taken through lines III—III of FIG. 2;

FIG. 4 is an elevational cross-sectional view of an electrochemical cell according to a second embodiment of the present invention taken through the longitudinal axis thereof;

FIG. 5 is an elevational cross-sectional view of an electrochemical cell of the present invention according to a third embodiment taken through the longitudinal axis thereof; and FIG. 6 is an elevational cross-sectional view of an electrochemical cell of the present invention according to a fourth embodiment taken through the longitudinal axis thereof.

DETAILED DESCRIPTION OF THE PREFERRED EMBODIMENTS

Referring now to FIG. 1, an electrochemical cell of a generally modified bobbin-type is shown having an increased anode-to-cathode interface surface area according to one embodiment of the present invention. The electrochemical cell 10 includes a positive electrode, referred to herein as the cathode, and a negative electrode, referred to herein as the anode, configured to realize a large anode-to-cathode interface area. Further, while the electrochemical cell 10 shown and described herein is a cylindrical alkaline cell, it should be appreciated that the teachings of the present invention are likewise applicable to other types of electrochemical cells having various sizes and configurations.

Electrochemical cell 10 includes a conductive container, such as cylindrical steel can 12, having a closed bottom end 14 and an open top end which is sealingly engaged with a cover and seal assembly 16. A thin layer of shrink tube insulation 18 is formed about the exterior surface of steel can 12, except for the top and bottom ends thereof. The closed bottom end 14 of can 12 may further include a positive cover (not shown) formed of plated steel with a protruding nub at its center region which may form the positive contact terminal of the cell 10. Assembled to the open end of the steel can 12 is the cover and seal assembly 16 which forms the negative contact terminal of cell 10.

Contained within steel can 12 is the positive electrode, referred to as the cathode 20, and the negative electrode, referred to as the anode 24, with a separator 22 interfaced with and disposed between the cathode 20 and anode 24. The cathode 20 may be formed of a mixture of manganese dioxide, graphite, potassium hydroxide solution, water, and other additives. The anode 24 may include a gel type anode formed of zinc powder, a gelling agent, and other additives and may be mixed with an electrolyte solution formed of potassium hydroxide, zinc oxide, and water. Disposed within the anode 24 is a current collector 32 which contacts zinc particles in the anode 24. The separator 22 serves as an interface that prevents the migration of solid particles between the cathode 20 and anode 24.

The cover and seal assembly 16 provides the closure to the assembly of electrochemical cell 10 and includes a seal body 28 and a compression member 30. The seal body 28 is generally shaped like a disk and made from electrically non-conductive material. The compression member 30 is a tubular-shaped metallic component that compresses the seal body 28 around the current collector 32. The cover and seal assembly 16 also includes an outer negative cover 26 welded to the exposed end of the current collector 32. The rim of steel can 12 is crimped inwardly toward the cell body to form a seal. The cover and seal assembly 16 with cover 26 may include a conventional round assembly, such as that disclosed in U.S. Pat. No. 5,422,201, which is hereby incorporated by reference.

The electrochemical cell 10 of the present invention employs a non-cylindrical cathode-to-anode interface which provides for an overall increase in anode-to-cathode interface surface area, in contrast to conventional cells having a continuous cylindrical anode-to-cathode interface. The anode-to cathode interface area is non-cylindrical a non-uniform in that the shape of the interface area varies at one or more locations along the length of the cell, in contrast to a continuous cylindrical shape. While the anode-to-cathode interface area is non-cylindrical, it is preferred that the radial cross section of the anode-to-cathode interface be substantially round throughout the entire length of the cell that houses the anode and cathode materials.

The cathode 20, according to a first embodiment, is configured as a plurality of cathode rings assembled to provide at least two different size inside diameters. The cathode rings have a constant outside diameter and vary in thickness to provide the different inside diameters. The first cell embodiment provides a stepped cathode configuration as seen through the longitudinal cross-sectional view.

With particular reference to FIG. 2, the steel can 12 is shown having the cathode 20 assembled with a plurality of cathode rings 20A–20D stacked one on top of another. The cathode rings 20A–20D are constructed according to a ring molded cathode cell assembly. For a ring molded cathode cell assembly, a plurality of ring molded cathodes, such as cathode rings 20A–20D, are formed having at least two different size inside diameters. The process of forming ring molded cathodes generally includes adding a measured charge of cathode mix to a ring shaped die set and, with the use of a die press, molding the cathode mix into the shape of a ring. The process of forming ring molded cathodes is widely known in the art. The insertion of the ring molded cathodes 20A–20D into can 12 may be accomplished by press fitting the bottom cathode ring 20A into the bottom portion of steel can 12. Next, the second from bottom cathode ring 20B is press fit into steel can 12 and on top of cathode ring 20A. The third cathode ring 20C, is then inserted on top of cathode ring 20B, and the fourth cathode ring 20D is inserted on top of cathode ring 20C. Cathode rings 20A–20D are pressed into steel can 12, preferably by way of an upper punch, and arranged such that adjacent rings have different size inside diameters.

Referring to FIG. 3, the two lower cathode rings 20A and 20B are shown therein. The bottom cathode ring 20A has an interior surface defined by a round radial cross section of an inside diameter $D_A$ into which the separator 22 and anode 24 are to be located. Cathode ring 20A substantially conforms to the shape of the bottom portion of steel can 12. In contrast, the adjacent, second-from-bottom cathode ring 20B has an interior surface defined by a round radial cross section of an inside diameter $D_B$, which is larger than diameter $D_A$. This difference in diameters $D_A$ and $D_B$ provides for a stepwise interface between cathode rings 20A and 20B, and thereby increases the amount of interfacing surface area that is realized between the cathode 20 and anode 24, in contrast to a continuously cylindrical anode-to-cathode interface. It should be appreciated that each of the cathode rings 20A–20D preferably provides a substantially round radial cross section. By providing a substantially round radial cross section of the interior surface of cathode 20, a uniform continuous surface parallel to the inside wall of can 12 is achieved, which allows the cathode 20 to expand as it discharges while uniformly maintaining the shape of the cathode 20 to prevent cathode breakage. While the radial cross section shown is substantially round, the cathode 20 has a non-cylindrical configuration as taken through its longitudinal axis such that an increased interface surface area between the anode 24 and the cathode 20 is realized.

The anode-to-cathode interface surface area is non-cylindrical in that the interface area includes both the longitudinally extending interface area as well as the radially extending interface area formed by the area inscribed between adjacent cathode rings. According to the four cathode ring embodiment shown herein, the anode-to-cathode interface surface area is equal to the summation of the inside surface area of each of the cathode rings 20A–20D, and further summed with the radial surface area inscribed between the two inside diameters of adjacent cathode rings, including the radial surface area between cathode rings 20A and 20B, the radial surface area between cathode rings 20B and 20C, and the radial surface area between cathode rings 20C and 20D. Accordingly, the radial surface area adds to the overall anode-to-cathode interface area realized with the present invention.

Referring again to FIG. 2, also shown is a process for applying a liquid spray-on separator 22 onto the inside walls of cathode 20. The spray-on separator 22 may be applied with a disk-shaped liquid separator dispenser 34 or other suitable separator application device. The liquid separator dispenser 34 may include a tube connected to a disk-shaped nozzle which spins to apply a liquid separator material by way of centrifugal force to coat the inside surface of cathode 20. The liquid spray-on separator material may include a starch according to one example. The liquid spray-on separator may alternately include a polystyrene separator such as that disclosed in issued U.S. Pat. No. 4,315,062, which is hereby incorporated by reference. The spray-on separator 22 preferably coats the inside walls of cathode 20 to provide a substantially uniform separator 22 that will interface between the cathode 20 and anode 24.

Once the separator 22 is formed on the interior surface of cathode 20, the anode 24 is disposed within the cavity provided in cathode 20. The anode 24 conforms to the shape of the cavity to consume the remaining volume within the interior surface of cathode 20. Once the cell materials, including the anode 24, cathode 20, separator 22, and electrolyte solution, have been disposed within steel can 12, the current collector 32 is assembled in contact with the anode 24, and the cover and seal assembly 16 is assembled to the open top end to seal the can 12.

While the first embodiment of cell 10 has been described in connection with a cathode 20 formed of four cathode rings 20A–20D, it should be appreciated that a different number of rings may likewise be provided to achieve a non-cylindrical anode-to-cathode interface with increased surface area to achieve lower current density and higher cell efficiency. According to one example of a AA-size cell, cathode rings 20A and 20C were provided with an inside diameter of 0.250 inches (0.635 centimeters) while cathode rings 20B and 20D were provided an inside diameter of 0.427 inches (1.085 centimeters), to provide an overall total cathode surface area of (2.026 inches squared) 13.073 centimeters squared. According to the aforementioned example, the cell with the anode and cathode as configured achieved a 12.4 percent increase in surface area over a conventional cylindrical cell having an cylindrical cathode inside diameter of 0.350 inches (0.889 centimeters). Based on an even number of rings of cylindrical shape, the total anode-to-cathode interface surface area can be increased by approximately eleven percent (11%) for each additional two rings. It has been found that at four rings per cell with the stepped arrangement, the performance on some high rate tests could be double compared to the present best performance obtained from a four ring uniform inside diameter cell construction. It should also be appreciated that a greater number of rings may be employed, such as six, eight, and ten rings or more. As the number of rings per cell increases, the anode-to-cathode interface surface area likewise increases. However, there is a compromise in that the thinner the rings are, the more difficult it becomes to apply the separator 22, as well as to provide proper location of the anode 24.

It should be appreciated that the present invention advantageously provides for enhanced anode-to-cathode interface surface area which provides a lower overall current density and thus results in higher cell efficiency, particularly for high rate cell performance. It should also be appreciated that other configurations can be provided to achieve increased anode-to-cathode interface surface area.

Referring to FIG. 4, a second embodiment of electrochemical cell 10 is illustrated therein in which the cathode 20 is formed in a cone-shaped configuration. The cathode 20 has a tapered inside surface into which cone-shaped separator 22 and anode 24 are provided. The cathode 20 is formed with its inside surface having a taper at an angle that is preferably greater than two degrees as taken from the longitudinal axis of the cell. The cone-shaped anode-to-cathode interface area achieved with the second embodiment likewise is non-cylindrical and has a substantially round radial cross section.

FIG. 5, a third embodiment of electrochemical cell 10 is shown therein. According to the third embodiment, the cathode 20 is configured having an inside diameter that continuously varies along the length of the cell, and has a radial cross section at all sections taken through the cell. From a longitudinal cross-sectional view, the anode-to-cathode interface surface has undulations or wave-like pattern, which effectively increases the anode-to-cathode interface surface area in contrast to that of a cylindrical cathode.

As shown in FIG. 6, a fourth embodiment of cell 10 is shown in which the cathode 20 maintains an inside diameter of uniform radial cross section throughout the length of cell 10. According to this fourth embodiment, the anode-to-cathode interface surface is non-cylindrical and continuously changes along the length of the cell to provide increased anode-to-cathode surface area. However, the inside diameter of the cathode 20 into which the anode 24 is provided maintains a uniform diameter, which may allow for ease of assembly of the anode.

Accordingly, electrochemical cell 10 of the present invention provides for a non-cylindrical cathode which effectively increases the anode-to-cathode surface interface area to achieve lower current density. This effectively results in higher cell efficiency and enhances the high rate cell performance. This is achieved by providing the cathode in a stepwise configuration, a V-shaped configuration, wave-like configuration, or other cathode configurations which provide an anode-to-cathode interface with a non-cylindrical shape that varies along the length of the cell.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. An electrochemical cell comprising:
    a container having a closed bottom end and an open top end;
    a first electrode disposed in said container, said first electrode having an outer perimeter which substantially conforms to the interior walls of said container and further having a non-cylindrical cavity provided therein;
    a second electrode disposed within said non-cylindrical cavity of said first electrode, wherein said first and second electrodes provide an interface area with a longitudinal cross-sectional shape that varies along the length of the cell;
    a separator disposed between said first electrode and said second electrode; and
    a cover and seal assembly assembled to said open top end of said container.

2. The electrochemical cell as defined in claim 1, wherein said interface area has a substantially round radial cross section.

3. An electrochemical cell comprising:
    a container having a closed bottom end and an open top end;
    a first electrode disposed in said container, said first electrode having an outer perimeter which substantially conforms to the interior walls of said container and further having a non-cylindrical cavity provided therein;
    a second electrode disposed within said non-cylindrical cavity of said first electrode, wherein said first and second electrodes provide an interface area that varies along the length of the cell;

a separator disposed between said first electrode and said second electrode; and a cover and seal assembly assembled to said open top end of said container, wherein said first electrode has a stepped inner surface defining said non-cylindrical cavity.

4. The electrochemical cell as defined in claim 1, wherein said first electrode has a tapered inside surface defining said non-cylindrical cavity, said tapered surface decreasing in radial width toward the bottom end of said container.

5. The electrochemical cell as defined in claim 1, wherein said first electrode has undulations formed on the inner walls thereof to provide for said non-cylindrical cavity.

6. The electrochemical cell as defined in claim 5, wherein said undulations provide a varying size radial cross section of said cavity.

7. The electrochemical cell as defined in claim 5, wherein said undulations provide a substantially equal radial cross section throughout said non-cylindrical cavity.

8. The electrochemical cell as defined in claim 1, wherein said first electrode comprises a cathode and said second electrode comprises an anode.

9. The electrochemical cell as defined in claim 1 further comprising a current collector connected to said first electrode.

10. The electrochemical cell as defined in claim 1, wherein said separator is provided as a spray on material.

11. The electrochemical cell as defined in claim 10, wherein said spray on material comprises starch.

12. An electrochemical cell comprising:

a container having a closed bottom end and an open top end;

a first electrode disposed in said container, said first electrode having an outer perimeter which substantially conforms to the interior walls of said container and further having a non-cylindrical cavity provided therein;

a second electrode disposed within said non-cylindrical cavity of said first electrode, wherein said first and second electrodes provide an interface area that varies along the length of the cell;

a separator disposed between said first electrode and said second electrode; and a cover and seal assembly assembled to said open top end of said container, wherein said first electrode comprises a plurality of cathode rings having at least two different size interior diameters, said cathode rings being stacked one on top another in said container.

13. An electrochemical cell comprising:

a conductive can having a closed bottom end and an open top end;

a first electrode disposed in said container, said first electrode having an outer perimeter which conforms to the interior walls of said container and further having a non-cylindrical cavity provided therein, said non-cylindrical cavity having a cone-shaped configuration with a substantially round radial cross section along the length of the cell;

a second electrode disposed within said non-cylindrical cavity of said first electrode;

a separator disposed between said first electrode and said second electrode; and the cover and seal assembly assembled to said open top end of said container.

14. An electrochemical cell comprising:

a conductive can having a closed bottom end and an open top end;

a first electrode disposed in said container, said first electrode having an outer perimeter which conforms to the interior walls of said container and further having a non-cylindrical cavity provided therein, said non-cylindrical cavity having a substantially round radial cross section along the length of the cell;

a second electrode disposed within said non-cylindrical cavity of said first electrode;

a separator disposed between said first electrode and said second electrode; and the cover and seal assembly assembled to said open top end of said container, wherein said first electrode has a stepped inner surface defining said non-cylindrical cavity.

15. The electrochemical cell as defined in claim 13, wherein said first electrode has a cone-shaped inside surface defining said non-cylindrical cavity, said cone-shaped surface decreasing in radial width toward the closed bottom end of said container.

16. An electrochemical cell comprising:

a conductive can having a closed bottom end and an open top end;

a first electrode disposed in said container, said first electrode having an outer perimeter which conforms to the interior walls of said container and further having a non-cylindrical cavity provided therein, said non-cylindrical cavity having a substantially round radial cross section along the length of the cell;

a second electrode disposed within said non-cylindrical cavity of said first electrode;

a separator disposed between said first electrode and said second electrode; and the cover and seal assembly assembled to said open top end of said container, wherein said first electrode has undulations formed on the inner walls thereof to provide said non-cylindrical cavity.

17. The electrochemical cell as defined in claim 16, wherein said undulations provide a varying size radial cross section of said cavity.

18. The electrochemical cell as defined in claim 16, wherein said undulations provide a substantially equal radial cross section throughout said non-cylindrical cavity.

19. An electrochemical cell comprising:

a conductive can having a closed bottom end and an open top end;

a first electrode disposed in said container, said first electrode having an outer perimeter which conforms to the interior walls of said container and further having a non-cylindrical cavity provided therein, said non-cylindrical cavity having a substantially round radial cross section along the length of the cell;

a second electrode disposed within said non-cylindrical cavity of said first electrode;

a separator disposed between said first electrode and said second electrode; and the cover and seal assembly assembled to said open top end of said container, wherein said first electrode comprises a plurality of cathode rings having at least two different size interior diameters, said cathode rings being stacked one on top another in said container.

20. A method of forming an electrochemical cell comprising the steps of:

provinding a container having a closed bottom end and an open top end;

disposing a first electrode in said container so that said first electrode has an outer perimeter which substantially conforms to interior walls of said container and further has a non-cylindrical cavity provided therein;

providing a separator in said non-cylindrical cavity of the first electrode;

disposing a second electrode within said non-cylindrical cavity of said first electrode, wherein said first and second electrodes provide an interface area with a longitudinal cross-sectional shape that varies along the length of the cell; and assembling a cover and seal assembly to said open top end of said container.

21. A method of forming an electrochemical cell comprising the steps of:

providing a container having a closed bottom end and an open top end;

disposing a first electrode in said container so that said first electrode has an outer perimeter which substantially conforms to interior walls of said container and further has a non-cylindrical cavity provided therein;

providing a separator in said non-cylindrical cavity of the first electrode;

disposing a second electrode within said non-cylindrical cavity of said first electrode, wherein said first and second electrodes provide an interface area that varies along the length of the cell; and assembling a cover and seal assembly to said open top end of said container, wherein said step of disposing said first electrode and said container further includes disposing multiple cathode rings of at least two different inner diameters.

22. The method as defined in claim 20, wherein said step of disposing said first electrode in said container further comprises forming said first electrode with a tapered inside surface defining said non-cylindrical cavity such that said tapered surface decreases in radial width toward the bottom end of said container.

23. The method as defined in claim 20, wherein said step of disposing said first electrode in said container further comprises forming undulations in the inner walls of said first electrode to provide for said non-cylindrical cavity.

24. The method as defined in claim 20, wherein said step of forming said separator comprises the step of spraying a liquid separator material on inner walls of said first electrode.

25. A method of forming an electrochemical cell comprising the steps of:

providing a container having a closed bottom end and an open top end;

disposing a first electrode in said container so that said first electrode has an outer perimeter which substantially conforms to interior walls of said container and further has a non-cylindrical cavity provided therein, said non-cylindrical cavity having a cone-shaped configuration with a substantially round radial cross section throughout the length of the cell;

providing a separator in said non-cylindrical cavity of the first electrode;

disposing a second electrode within said non-cylindrical cavity of said first electrode; and assembling a cover and seal assembly to said open top end of said container.

26. A method of forming an electrochemical cell comprising the steps of:

providing a container having a closed bottom end and an open top end;

disposing a first electrode in said container so that said first electrode has an outer perimeter which substantially conforms to interior walls of said container and further has a non-cylindrical cavity provided therein, said non-cylindrical cavity having a substantially round radial cross section throughout the length of the cell;

providing a separator in said non-cylindrical cavity of the first electrode;

disposing a second electrode within said non-cylindrical cavity of said first electrode; and assembling a cover and seal assembly to said open top end of said container, wherein said step of disposing said first electrode in said container further includes disposing multiple cathode rings of at least two different inner diameters.

27. The method as defined in claim 25, wherein said step of disposing said first electrode in said container further comprises forming said first electrode with a cone-shaped inside surface defining said non-cylindrical cavity such that said cone-shaped surface decreases in radial width toward the bottom end of said container.

28. A method of forming an electrochemical cell comprising the steps of:

providing a container having a closed bottom end and an open top end;

disposing a first electrode in said container so that said first electrode has an outer perimeter which substantially conforms to interior walls of said container and further has a non-cylindrical cavity provided therein, said non-cylindrical cavity having a substantially round radial cross section throughout the length of the cell;

providing a separator in said non-cylindrical cavity of the first electrode;

disposing a second electrode within said non-cylindrical cavity of said first electrode; and assembling a cover and seal assembly to said open top end of said container, wherein said step of disposing said first electrode in said container further comprises forming undulations in the inner walls of said first electrode to provide for said non-cylindrical cavity.

29. The method as defined in claim 25, wherein said step of forming said separator comprises the step of spraying a liquid separator material on inner walls of said first electrode.

* * * * *